(12) United States Patent
Martini et al.

(10) Patent No.: US 10,817,269 B2
(45) Date of Patent: Oct. 27, 2020

(54) NETWORK DISTRIBUTED PROGRAMMABLE FORWARDING PLANE PACKET PROCESSOR

(71) Applicant: Charter Communications Operating, LLC, St. Louis, MO (US)

(72) Inventors: Luca Martini, Lakewood, CO (US); Jim Rampley, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 3 days.

(21) Appl. No.: 16/009,577

(22) Filed: Jun. 15, 2018

(65) Prior Publication Data
US 2019/0384580 A1 Dec. 19, 2019

(51) Int. Cl.
- G06F 8/30 (2018.01)
- G06F 8/35 (2018.01)
- H04W 76/12 (2018.01)
- G06F 8/61 (2018.01)
- G06F 8/41 (2018.01)

(52) U.S. Cl.
CPC .............. *G06F 8/35* (2013.01); *G06F 8/41* (2013.01); *G06F 8/61* (2013.01); *H04W 76/12* (2018.02)

(58) Field of Classification Search
CPC ..... G06F 8/35; G06F 8/41; G06F 8/61; G06F 8/30; H04W 76/12
See application file for complete search history.

(56) References Cited

U.S. PATENT DOCUMENTS

| | | | | |
|---|---|---|---|---|
| 8,943,489 B1* | 1/2015 | Qu | ........................ | G06F 8/656 717/168 |
| 2004/0158823 A1* | 8/2004 | Saint-Hilaire | ............ | G06F 8/30 717/140 |
| 2010/0088652 A1* | 4/2010 | Ramsay, III | ............ | G06F 3/038 715/857 |
| 2010/0153473 A1* | 6/2010 | Gopalan | ................... | G06F 8/10 707/810 |
| 2014/0169213 A1* | 6/2014 | Rickman | ............. | H04L 41/5041 370/254 |
| 2016/0119209 A1* | 4/2016 | Rosengarten | ....... | H04L 43/0817 709/224 |
| 2016/0191306 A1* | 6/2016 | Gasparakis | ............. | H04L 67/34 370/419 |

(Continued)

OTHER PUBLICATIONS

Hancock et al, HyPer4: Using P4 to Virtualize the Programmable Data Plane, Dec. 2016 (Year: 2016).*

*Primary Examiner* — Jae U Jeon
(74) *Attorney, Agent, or Firm* — The Marbury Law Group, PLLC

(57) ABSTRACT

Systems, methods, and devices for using a domain-specific programming language to remotely and dynamically program deployed forwarding plane components. A controlling server may establish a communication link to the remote network component, and receive a capabilities data model from the remote network component via the communication link. The controlling server may use the information included in the received capabilities data model to generate a tailored code segment, and send the tailored code segment to the remote network component via the communication link. The remote network component may receive, compile, install and execute the tailored code segment to modify its operation and/or to modify the functionality of the network.

49 Claims, 6 Drawing Sheets

(56) References Cited

U.S. PATENT DOCUMENTS

2017/0046230 A1\* 2/2017 Guzik .................. G06F 11/1464
2017/0052970 A1\* 2/2017 Crabtree ................ G06F 8/315
2017/0251050 A1\* 8/2017 Masson ............... H04L 67/2847
2019/0058631 A1\* 2/2019 Zhou ................... H04L 41/0816

\* cited by examiner

NETWORK DISTRIBUTED PROGRAMMABLE FORWARDING PLANE PACKET PROCESSOR

BACKGROUND

In packet switching networks, data packets may be transmitted from one network component to another network component. Each data packet may include one or more packet headers that contain routing information. The routing information may specify the destination to which the data packet is to be routed or the route that the data packet may take. Network components (e.g., routers, switches, etc.) may use the routing information to deliver each packet to its destination in accordance with a network protocol (e.g., TCP/IP, BGP, ISIS). The network components may include a packet processor that is configured to apply an algorithm or procedure to the data packets as they move through the communication network. The packet processor typically includes, contains, encompasses or utilizes an application specific integrated circuits (ASICs) or an integrated circuit (IC) that is customized for a particular routing use.

Using conventional solutions, packet processors cannot be readily modified to accept newly-invented protocols, particularly if they include a customized circuit such as an ASIC. Rather, data packets having protocols that are not directly supported by the packet processor firmware are processed via firmware executing on a general purpose processor at a much slower rate.

In addition, using conventional systems, the packet processors within network components must typically be programmed when the router first initializes and in advance of forwarding network packets. For example, packet processors are typically programmed at initialization time by the manufacturer with fixed instructions on how to lookup packets in forwarding tables or filter lists. The packet processors are also typically programmed with fixed forwarding instructions that define how the packet is matched to an entry in the forwarding table. As a result, while conventional packet processors may dynamically update the forwarding tables, they cannot quickly, efficiently, and dynamically update their programming to update, alter or augment their underlying functionality or operations after initialization or deployment. Accordingly, new and improved solutions for remotely and dynamically updating the programming of a large number of deployed network elements (e.g., packet processor within routers devices, etc.) will be beneficial to device manufactures, network operators, and consumers.

SUMMARY

The various aspects include methods of dynamically programming a remote network component (network device) deployed in a communication network, which may include establishing via a processor in a controlling server computing device a communication link to the remote network component, receiving via the processor in the controlling server computing device a capabilities data model from the remote network component via the communication link, generating via the processor in the controlling server computing device a tailored code segment based on information included in the received capabilities data model, and sending via the processor in the controlling server computing device the tailored code segment to the remote network component via the communication link to modify the functionality of the remote network component.

In an aspect, the method may include receiving the tailored code segment in the remote network component, compiling the tailored code segment in the remote network component to generate domain-specific binary code, and installing and executing the domain-specific binary code to be executed by the packet processor of the remote network component to modify the functionality of the remote network component. In a further aspect, compiling the tailored code segment in the remote network component to generate the domain-specific binary code may include compiling a tailored P4 computer language code segment in the remote network component to generate the domain-specific binary code. In a further aspect, the method may include using a domain-specific modeling language to generate the capabilities data model in the remote network component.

In a further aspect, the method may include establishing a high speed data forwarding tunnel between the controlling server computing device and the remote network component. In a further aspect, the method may include receiving via the processor in the controlling server computing device a communication message from the remote network component in response to sending the generated code segment to the remote network component. In a further aspect, the received communication message may include information indicating whether the generated code segment successfully complied in the remote network component.

In a further aspect, generating the tailored code segment based on information included in the received capabilities data model may include generating a tailored domain-specific programming language code segment. In a further aspect, the method may include determining whether to send the tailored code segment to the remote network component based of the information included in the received capabilities data model. In a further aspect, generating the tailored code segment based on information included in the received capabilities data model including tailoring the code segment to ensure that it matches the capabilities of the remote network component. In a further aspect, the method may include sending data to populate a lookup table created based on the tailored code segment. In a further aspect, the method may include receiving, via the processor in the controlling server computing device, a communication message from the remote network component, in which the received communication message may include information generated based on a tailored code segment.

In a further aspect, generating, via the processor in the controlling server computing device, the tailored code segment based on information included in the received capabilities data model may include generating a plurality of different tailored code segments via a plurality of different cloud applications. In an aspect, sending, via the processor in the controlling server computing device, the tailored code segment to the remote network component via the communication link to modify the functionality of the remote network component may include sending the plurality of different tailored code segments generated via the plurality of different cloud applications to the same remote network component to modify the functionality of a forwarding plane component that is included in or otherwise associated with the remote network component.

Further aspects may include receiving via a processor in a remote network component a tailored code segment from a controlling server computing device, compiling, via the processor, the tailored code segment to generate domain-specific binary code, installing the domain-specific binary code for execution via a forwarding plane component, and executing the domain-specific binary code via the forwarding plane component to dynamically modify the functionality of the network device. In an aspect, compiling the tailored code segment to generate the domain-specific binary code may include compiling a tailored P4 computer language code segment to generate the domain-specific binary code. Further aspects may include using a domain-specific modeling language to generate the capabilities data model in the network device. Further aspects may include establishing a high speed data forwarding tunnel between the controlling server computing device and the network device.

Further aspects may include determining whether the generated code segment successfully complied in the network device (remote network component), generating a communication message that includes information indicating whether the generated code segment successfully complied in the network device, and sending the generated communication message to the controlling server computing device. In a further aspect, receiving the tailored code segment from the controlling server computing device may include receiving a tailored domain-specific programming language code segment. In a further aspect, receiving the tailored code segment from the controlling server computing device may include receiving a code segment tailored to match the capabilities of the network device.

In a further aspect, the method may include creating a lookup table based on the tailored code segment received from the controlling server computing device, receiving additional data from the controlling server computing device in response to creating the lookup table, and populating the lookup table based on the additional data received from the controlling server computing device. In a further aspect, receiving the tailored code segment from the controlling server computing device may include receiving a plurality of different tailored code segments generated via a plurality of different cloud applications. In a further aspect, compiling the tailored code segment via the compiler to generate the domain-specific binary code includes compiling the plurality of different tailored code segments generated via the plurality of different cloud applications to generate the domain-specific binary code. In a further aspect, executing the domain-specific binary code via a forwarding plane component to dynamically modify the functionality of the network device includes executing the domain-specific binary code via a packet processor to dynamically modify the functionality of the network device.

Further embodiments may include a controlling server computing device that includes a processor configured with processor-executable instructions to perform operations including establishing a communication link to the remote network component, receiving a capabilities data model from the remote network component via the communication link, generating a tailored code segment based on information included in the received capabilities data model, and sending the tailored code segment to the remote network component via the communication link to dynamically modify the functionality of the remote network component.

Further embodiments may include a network device that includes a compiler, a forwarding plane component, and a processor coupled to the compiler and forwarding plane component. The processor may be configured with processor-executable instructions to perform operations including receiving a tailored code segment from a controlling server computing device, compiling the tailored code segment via the compiler to generate domain-specific binary code, and installing domain-specific binary code for execution via the forwarding plane component. The network device may execute the domain-specific binary code via the forwarding plane component to dynamically modify the functionality of the network device.

Further embodiments may include a non-transitory computer readable storage medium having stored thereon processor-executable software instructions configured to cause a processor in a controlling server computing device to perform operations that include establishing a communication link to the remote network component, receiving a capabilities data model from the remote network component via the communication link, generating a tailored code segment based on information included in the received capabilities data model, and sending the tailored code segment to the remote network component via the communication link to dynamically modify the functionality of the remote network component.

Further embodiments may include a non-transitory computer readable storage medium having stored thereon processor-executable software instructions configured to cause a processor in a network device to perform operations including receiving a tailored code segment from a controlling server computing device, compiling the tailored code segment via a compiler to generate domain-specific binary code, installing and executing the domain-specific binary code via a forwarding plane component to dynamically modify the functionality of the network device.

Further embodiments may include a non-transitory computer readable storage medium having stored thereon processor-executable software instructions configured to cause a processor in a controlling server computing device to perform operations that include establishing a communication link to the remote network component, receiving a capabilities data model from the remote network component via the communication link, generating a tailored code segment based on information included in the received capabilities data model, and sending the tailored code segment to the remote network component via the communication link to dynamically modify the functionality of the remote network component.

Further embodiments may include a non-transitory computer readable storage medium having stored thereon processor-executable software instructions configured to cause a processor in a network device to perform operations including receiving a tailored code segment from a controlling server computing device, compiling the tailored code segment via a compiler to generate domain-specific binary code, installing and executing the domain-specific binary code via a forwarding plane component to dynamically modify the functionality of the network device.

Further aspects may include a computing device having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
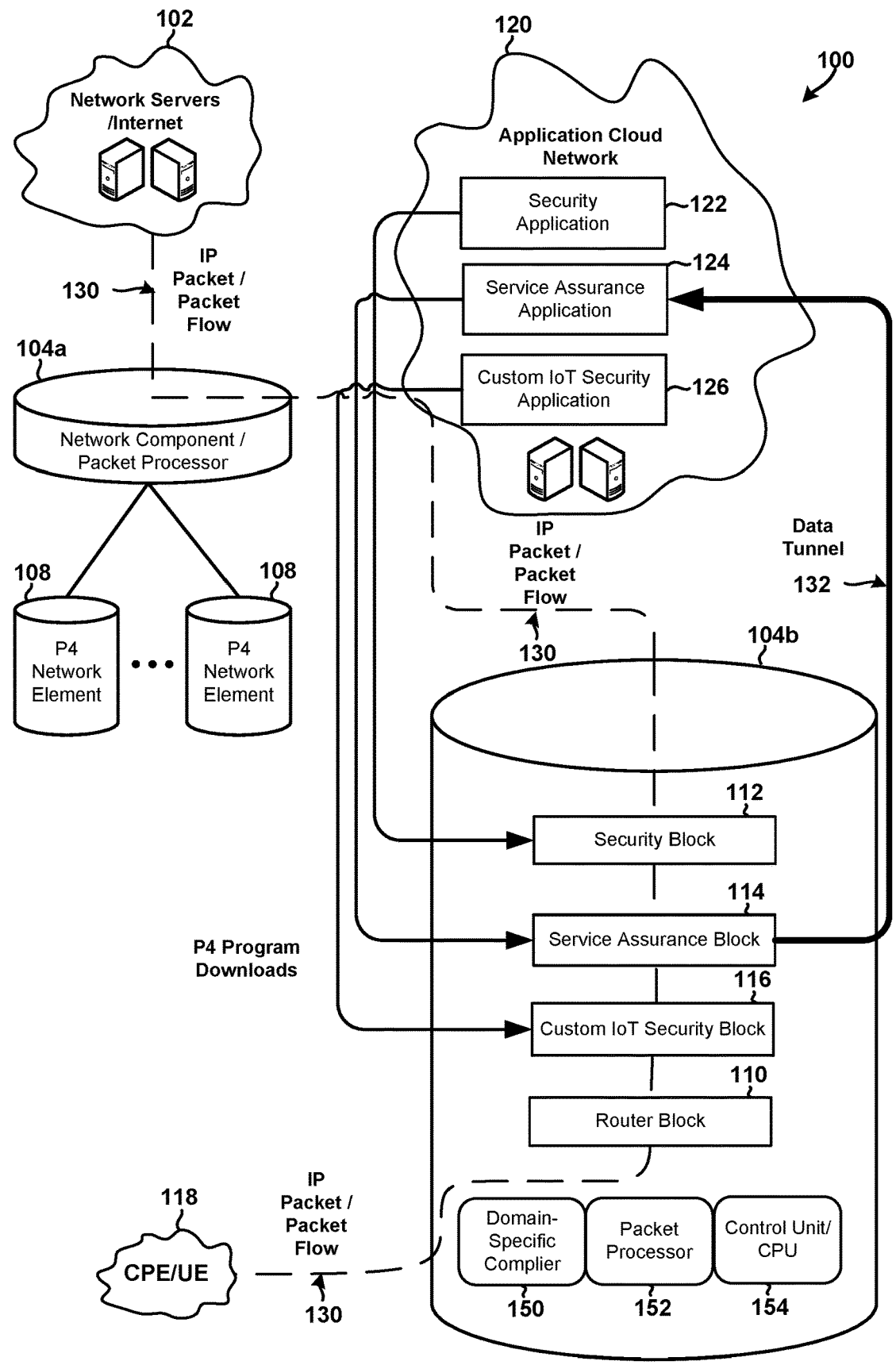
FIG. 1 is a communication system block diagram of an Internet Protocol (IP) network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices configured to implement the methods, for using a domain-specific programming language (e.g., the P4 programming language, etc.) to remotely and dynamically program, update, or otherwise alter the functionality of one or more forwarding plane components (e.g., P4 programmable packet processors, etc.) that are included in one or more network components (e.g., access router, access switch, etc.) deployed in a communication network.

In the various embodiments, a controlling server computing device may be configured to work in conjunction with one or more remote network components to dynamically update, alter, or augment the network functionality. The controlling server computing device may include a virtual machine or an application running on commodity hardware and/or via a cloud network. The controlling server computing device may be configured to send, push, broadcast, transmit or otherwise transfer segments of domain-specific programming language code (e.g., P4 programming primitives, etc.) to one or more remote network components that are deployed in an end-to-end communication system.

Each of the network components may be equipped with a domain-specific compiler, a control unit/CPU, and a packet processor. The network components may receive and compile the code segments into domain-specific binary code that is suitable for execution on its packet processor. The network components may install the domain-specific binary code for execution via the packet processor. The efficient installation of locally compiled domain-specific binary code enables the system to quickly and efficiently augment or alter the functionality of a deployed network component in real time, while in service.

In some embodiments, the remote network components may be further configured to use a domain-specific modeling language (e.g., YANG, etc.) to generate data models. The remote network components may generate data models that identify their capabilities (e.g., processing capabilities, available memory, available bandwidth, operating system version, hardware configurations, supported protocols, etc.). The data models may also include telemetry and other data that could be used by the controlling server computing device to tailor the code segments. The remote network components may send the generated models to the controlling server computing device. In some embodiments, the remote network components may send the generated models using an existing or conventional protocol, such as NETCONF, RESTCONF or GRPC.

The controlling server computing device may be configured to receive and use the data models to identify, determine, or generate the domain-specific programming language code segments (e.g., P4 programming primitives, etc.). The controlling server computing device may tailor each of the code segments to ensure that they match the capabilities of the remote network component to which the code segments are to be sent. The controlling server computing device may also use received data models to intelligently determine whether to send a particular code segment to a network component, to identify the remote network components to which a particular code segment should be sent, and perform other similar operations. The controlling server computing device may send the generated code segments to the remote network components, which may receive and locally compile the code segments into the domain-specific binary code suitable for augmenting or otherwise altering its functionality.

In some embodiments, the controlling server computing device and/or the remote network components may be configured to perform various operations to establish and maintain a feedback communications link, channel, or connection. The remote network components may use the feedback communications link/channel to report compile time errors, device capability mis-matches, resource exhaustion, and/or other similar information. In some embodiments, the devices/components may be configured to establish and maintain TCP connections from the network element's main CPU to a virtual server for operations, administration and maintenance (OAM) purposes. In some embodiments, the controlling server computing device may implement the virtual server, or vice versa.

In some embodiments, the controlling server computing device and/or the remote network components may be configured to perform various operations to establish and maintain a high speed data forwarding tunnel (or feedback tunnel) that is suitable for communicating network information. For example, a remote network component may use a high speed data forwarding tunnel to send any or all interesting packets back to the controlling server computing device for further analysis. As another example, a remote network component may use a high speed data forwarding tunnel to send the controlling server computing device network telemetry information at high speeds.

By equipping the network components with a domain-specific compiler that locally compiles domain-specific programming language code for specific chip-sets (e.g., packet processors, ASICs, etc.) at runtime and after deployment, the various embodiments allow for dynamically updating the functionality of network devices (remote network components) that are deployed in an end-to-end communication system. In addition, by deploying a controlling server computing device via a cloud network so that it may generate and send targeted domain-specific programming language code segments to many network components (e.g., 100,000 routers, etc.) in the end-to-end communication system, the various embodiments allow a network operator to inspect, "scrub," or block traffic at nearly every component in the network. The various embodiments also allow for the network operator to install functionality that provides the operator with core visibility into any or all of the traffic and applications in the network (i.e., not just at peering nodes or exit points). Moreover, the various embodiments allow the end-to-end communication system to better use telemetry information to get, use or generate a full real time matrix of network performance (e.g., packet loss, delay, etc.) across all network elements operating within system.

The various embodiments also allow for the installation and use of applications that provide core network security, performance monitoring, and/or law enforcement functions on a shared forwarding infrastructure and/or on a shared hardware platform. The embodiments provide a standard protocol for downloading forwarding, inspection, accounting, and other functions to every network component at the edge and/or core of the service provider network. The embodiments allow the network operator to modify how the network devices forward, modify, or drop a specific network packet based on a criterion that is defined on the fly by the network operator, the controlling server computing device, the deployed networks components, or a remote application.

For all the forgoing reasons, the various embodiments improve the performance and functioning of the communication system and its constituent network components. Other improvements to performance and functioning of the communication system and its constituent network components will be evident from the disclosures below.

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "computing device" may be used herein to refer to any one or all of satellite or cable set top boxes, laptop computers, rack mounted computers, routers, cable modem termination systems (CMTSs), cellular telephones, smart phones, personal or mobile multi-media players, personal data assistants (PDAs), customer-premises equipment (CPE), equipment (UE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), set-top boxes, fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The term "system on chip" (SOC) may be used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (packet processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The terms "component," "system," "engine," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "markup language" may be used generically in this application to refer to any computing or programming language and/or system for annotating text such that a processor may syntactically distinguish the annotations from the text. Examples of markup languages include Scribe, Standard Generalized Markup Language (SGML), Hyper-Text Markup Language (HTML), Extensible Markup Language (XML), and Extensible Hyper-Text Markup Language (XHTML).

The term "dynamic language" may be used generically in this application to refer to any computing or programming language used to write programs that are interpreted and/or compiled at runtime, or which runs on a managed runtime and is dynamically compiled. Examples of dynamic languages within the scope of this application include, for example, JavaScript®, Perl, Python, and Ruby.

The term "modeling language" may be used generically in this application to refer to any computing or programming language that may be used to express information or knowledge or systems in a structure that is defined by a consistent set of rules. These rules may be used for interpretation of the meaning of components in the structure. Examples of modeling languages within the scope of this application include, for example, YANG and TOSCA.

A domain-specific language is a special-purpose computer language that is specialized to a particular application domain. This is in contrast to a general-purpose language, which is typically applicable to and across multiple domains. A domain-specific language may be subclassified as a domain-specific markup language, a domain-specific modeling language, or domain-specific programming language.

P4 is domain-specific programming language that allows for the programming of packet processors and forwarding plane components of a routing system. P4 programs are designed to be implementation-independent, and thus may be compiled against many different types of execution machines, which are sometimes called "P4 targets" or "P4 network elements." Example execution machines may include general-purpose CPUs, FPGAs, system(s)-on-chip, network processors, forwarding chip-sets, packet processors, and/or ASICs. Each execution machines may be equipped with a compiler that maps the P4 source code into a target switch model. The compiler may be embedded in the execution machine, in externally running software, or in a cloud service component.

YANG is a domain-specific data modeling language that may be used to define data that is sent over a specific network configuration protocol. The YANG modeling language may be used to model both configuration data as well as state data of network elements, and may be converted into any encoding format (e.g. XML, JSON, etc.) that is supported by the network configuration protocol.

For ease of reference, some embodiments may be discussed in this application using terminology that is specific to P4 and YANG languages. However, it should be understood that references to terminology and/or technical details related to these individual programming languages are for illustrative purposes only, and not intended to limit the scope of the claims to a particular programming language or technology unless specifically recited in the claim language.

Generally, a router is a networking device or component that forwards data packets between nodes in a computer network. A router may be a implement an architecture that divides the routing functionality into a control plane and a forwarding plane. Depending on the specific application or technology, the forwarding plane may be referred to a "data plane," "user plane," or "transport plane." For consistency and ease of reference, the term forwarding plane is used through this document. However, it should be understood that the term "forwarding plane" may encompass functions of the data plane, user plane, and/or transport plane.

Each router may include one or more control plane components and/or one or more forwarding plane components. The control plane components and the forwarding plane components do not need to be resident on the same physical hardware or have a one-to-one relationship. In addition, the router may be a distributed architecture router that includes a large number of routing components that are coupled to each other via communication links and/or a switched fabric network topology. Each of these routing components may include a control plane component, a forwarding plane component, or both.

The control plane components may be configured to implement or perform various control plane functions/operations, which may include determining or drawing a network topology, managing the information in routing tables, populating or updating a routing information base (RIB) or forwarding information base (FIB), analyzing packets, defining or determining the packets that are to be discarded by the router, defining or determining the packets that are to receive preferential treatment, and other similar functions or operations. In some embodiments, the control plane components may be implemented via virtualized machine software. In some embodiments, the control plane components may be implemented via standalone server computing device.

Forwarding plane components implement or perform various forwarding plane operations, which may include determining whether to forward, drop, consume or replicate packets based on various characteristics, such as their MAC address, IP address, and VLAN ID. Forwarding plane operations may also include using the information stored in FIB to look up the destination address of an incoming packet, retrieving information necessary to determine the path from the receiving element or input interface through the internal forwarding fabric of the router to the proper output interface. The passage from the input interface to the output interface with minimum modification in the internal forwarding fabric is often referred to as the "fast path" of the router. If the packet needs significant processing, such as segmentation or encryption, it may go onto a slower path, which is sometimes called the services plane of the router.

A forwarding plane component may include a packet processor that is configured to perform forwarding plane operations. A packet processor may be hardware, firmware, a combination of hardware and software, software, a general-purpose processor, an application specific integrated circuits (ASICs) or an integrated circuit (IC) that is customized for a particular routing use, a chip designed to operate within a router, etc. Conventional packet processors do not include compilers. As such, using conventional solutions, packet processors typically cannot be modified remotely via a high-level language to accept newly-invented protocols, particularly if the packet processor includes a customized circuit such as an ASIC. Data packets with protocols that are unsupported by the packet processor are often processed via the router's firmware (and general CPU) at a much slower rate than the packet processor.

A packet processor may include multiple processing blocks that are each configured to perform a specific function, such as data extraction or encapsulation. The processing blocks may operate independently, concurrently and/or in parallel. The packet processor may also include multiple sub-processors pipelined (e.g., in series, in parallel, etc.), and configured to operate independently of each other. The independent operation of the sub-processors may allow the concurrent processing of different packet data at different stages/blocks of the pipeline. In some embodiment, each processing block may be associated with a sub-processor. In some embodiments, each processing block may include software instructions and data tables.

A routing information base (RIB) is a data table stored in a memory of the router or a networked computer that includes information suitable for identifying the routes to particular network destinations. The RIB may also store various metrics (e.g., distances, etc.) associated with the routes and network topology information. The RIB may store static routes that are determined and added to the RIB via static or non-automatic means. The routes may also be non-static routes that are determined based on a network topology "discovery" procedure.

The FIB may be a dynamic data table stored in a memory of the router or a networked computer includes information suitable for mapping addresses to ports. The forwarding plane component may use the FIB to find the proper interface to which an input interface should forward a data packet. Depending on the specific application or technology, the FIB may be referred to as a forwarding table, filter list, media access control (MAC) table, MAC address table, content addressable memory (CAM) table, or as ternary content addressable memory (TCAM). For consistency and ease of reference, the term FIB is used through this document.

Some conventional router solutions may use probes to capture data packets, and send them to a control plane component for analysis. The control plane component may analyze the data packets, and send a policy, rule or instruction to the forwarding plane component for enforcement. For example, the control plane component may request that the forwarding plane component block all or portions of a particular data packet stream. The control plane component may also make various other decisions for enforcing policies (e.g., legal policies, traffic policies, etc.) or to provide a service (e.g., security service to an end user, etc.).

Conventional router solutions that utilize probes typically consume a significant the amount of bandwidth and resources (e.g., processing resources, memory resources, etc.). It is also challenging and expensive to deploy and maintain such solutions throughout the network. As a result, conventional solutions typically only deploy such probes at a limited number of peering points, exit nodes, or exit regions, and thus do not provide core visibility of all the traffic and all the applications in the network. By deploying a controlling server computing device via a cloud network so that it may generate and send targeted domain-specific programming language code segments to every forwarding plane component (or packet processor) in the network, the various embodiments may provide the operator with core visibility into any or all of the traffic and applications in the network (i.e., not just at peering nodes or exit points).

In some embodiments, the controlling server computing device may be configured to detect the presence or existence of a new protocol (or strange, unexpected or new data in the data packets), analyze or decode the new protocol, and push out updated domain-specific programming language code segments to the remote network components (or packet processors) to allow them to interpret, understand or otherwise respond to the new protocol.

In some embodiments, the controlling server computing device may be configured to detect the presence or existence of strange, unexpected or new data in the data packets, and push out domain-specific programming language code segments to the remote network components (or packet processors) that cause the network components to test the data packets for select characteristics and report packets that meet certain criteria (e.g., automatically report all data packets that are a specific size, etc.). As a further example, the domain-specific programming language code segments may cause the network components to implement complex algorithms on customized hardware. For example, compiling and installing the code segments on the network elements may cause them to identify complex traffic patterns, remove data packets associated with the identified patterns from of network or normal data flow, and send the data packets to robust malware detection system or application for further or more detailed analysis.

In some embodiments, the controlling server computing device and/or the network components may be configured to perform forwarding based on almost any new or strange criteria, including at the application layer. For example, the controlling server computing device may be configured push out domain-specific programming language code segments to the remote network components (or packet processors) that cause the network components to send select data units (e.g., data packets associated with a tweets originating from a specific user account, etc.) through a long route around the world, but allow all other similar data units (e.g., tweets from other similar accounts, etc.) to follow the normal path.

In some embodiments, the controlling server computing device may be configured to send a first code segment to a first network device and a second code segment to a second network device. The first code segment may cause the first network device to modify the packet to include an extra header (e.g., after the IP address, etc.). The second code segment may cause the second network device to inspect the packets, identify packets having an extra header, remove the identified packets, determine the amount of time that it took for the packet to travel between the first and second network devices, increment a counter, download additional counters, and/or send the packets to an external application for further analysis.

In some embodiments, the controlling server computing device may be configured to receive packet performance data from the network devices, and generate the domain-specific programming language code segments based on the received packet performance data. In some embodiments, the controlling server computing device may be configured to send packet performance data along with the domain-specific programming language code segments to the network components. The network components may be configured to update their operations based on the packet performance data.

FIG. 1 illustrates example components, communication links, information flows within a communication network 100 that suitable for implementing the various embodiments. In particular, FIG. 1 illustrates that a customer-premises equipment (CPE) and/or user equipment (UE) devices 118 may send and receive IP packets/packet flow 130 via communication links (wired or wireless) to one or more network servers 102, which may provide a connection to the Internet and/or content servers (not illustrated separately in FIG. 1). The wired communication links may be achieved via cable, fiber, or any medium suitable for communicating IP data or audio-visual content. Wireless communication links may be via short-range radio technologies (e.g., Bluetooth®, WiFi, etc.), via peer-to-peer connections, or via any other known wireless communication technology. The IP packets/packet flow 130 may flow through a plurality of network components 104 and P4 network elements 108. The network components 104a, 104b may be network routers, network switches, or other similar computing systems.

In the example illustrated in FIG. 1, network component 104b is a router component that includes a domain-specific compiler 150, a packet processor 152, and a control unit/

CPU 154. The network component 104*b* may be configured to communicate with one or more controlling server computing devices that implement an application cloud network 120. The controlling servers in the application cloud network 120 may generate and send P4 program downloads or cloud applications 122, 124, 126 to the network component 104*b* to remotely and dynamically program, re-program, or otherwise alter the functionality of one or more forwarding plane components (e.g., packet processors, etc.) that are included in or otherwise associated with the network component 104*b*. In some embodiments, each of the applications 122, 124, 126 may include one or more domain-specific programming language code segments.

Thus, in some embodiments, a controlling server in the application cloud network 120 may include or may be associated with a plurality of different cloud-based applications (e.g., applications 122, 124, 126). Each of the cloud-based applications may be configured to generate one or more tailored domain-specific programming language code segments (tailored code segments). The controlling server may be configured to send multiple tailored code segments that are each generated by a different cloud-based application to the same network component 104*b*. The network component 104*b* may receive these tailored code segments, compile them to generate domain-specific binary code, and install the domain-specific binary code for execution via a forwarding plane component (packet processor) that is included in or associated with a specific network component 104*b*. As such, the combination of the different tailored code segments generated by the different cloud-based applications may modify the functionality of the network component 104*b* and/or its forwarding plane component.

The network component 104*b* may also include a plurality of execution or processing blocks 110-116. Block 110 may be a router block that includes standard router code for implementing conventional or updated router functionality. Block 110 may be generated via the router's operating system, by the original equipment manufacturer, and/or at the time of manufacture.

Blocks 112-116 may be generated dynamically after the network component 104*b* is deployed in the network. For example, blocks 112-116 may be generated via the network component 104*b* receiving code segments (e.g., applications 122, 124, 126), compiling the code segments into domain-specific binary code via the domain-specific compiler 150, and installing/executing the domain-specific binary code via the packet processor 154. That is, network component 104*b* may install/execute the domain-specific binary code to quickly and efficiently augment or alter its functions.

In the various embodiments, each of blocks 112-116 may include lookup tables, memories, a processor or sub-processor, an execution environment, lookup code, accounting code, tunneling code, domain-specific markup language code, domain-specific modeling language code, and/or domain-specific programming language code. For example, security block 112 may include logic, code, and tables for implementing a security solution (e.g., to block packets associated with malware, identify and report suspicious traffic patterns, etc.). Similarly, the service assurance block 114 may include logic, code, and tables for implementing a service for the end user. The custom IOT block 116 may include logic, code, and tables for implementing an IOT security solution. The blocks 112-116 may be processing blocks that operate independently, concurrently and/or in series.

It should be understood that blocks 110-116 may operate in any order, and that a network component (e.g., network component 104*b*) may include any number of blocks that each perform any number of operations. Therefore, nothing in the above description should be used to limit the scope of the claims to a specific order or sequence of operations unless expressly recited as such in the claims.

In some embodiments, the network component 104*b* may be further configured to use a domain-specific modeling language (e.g., YANG, TOSCA, etc.) to generate data models that identify its capabilities (e.g., processing capabilities, available memory, available bandwidth, operating system version, hardware configurations, supported protocols, etc.), and send the data models to the application cloud network 120. In some embodiments, the network component 104*b* may be configured to use a specific protocol, such as NETCONF, RESTCONF or GRPC, to send the data models to the application cloud network 120. The servers in the application cloud network 120 may receive and use the data models to identify, determine, or generate the domain-specific programming language code segments (e.g., P4 programming primitives, etc.), and tailor each of the code segments to ensure that they match the capabilities of the network component 104*b*, packet processor 152, or service assurance block 114.

In the example illustrated in FIG. 1, service assurance block 114 also includes logic for establishing and maintaining a feedback data tunnel 132 with the service assurance application 124 in the application cloud network. The service assurance block 2 may use the feedback data tunnel 132 to send the data models and/or to report compile time errors, device capability mis-matches, resource exhaustion, or other similar information.

Figure 2:
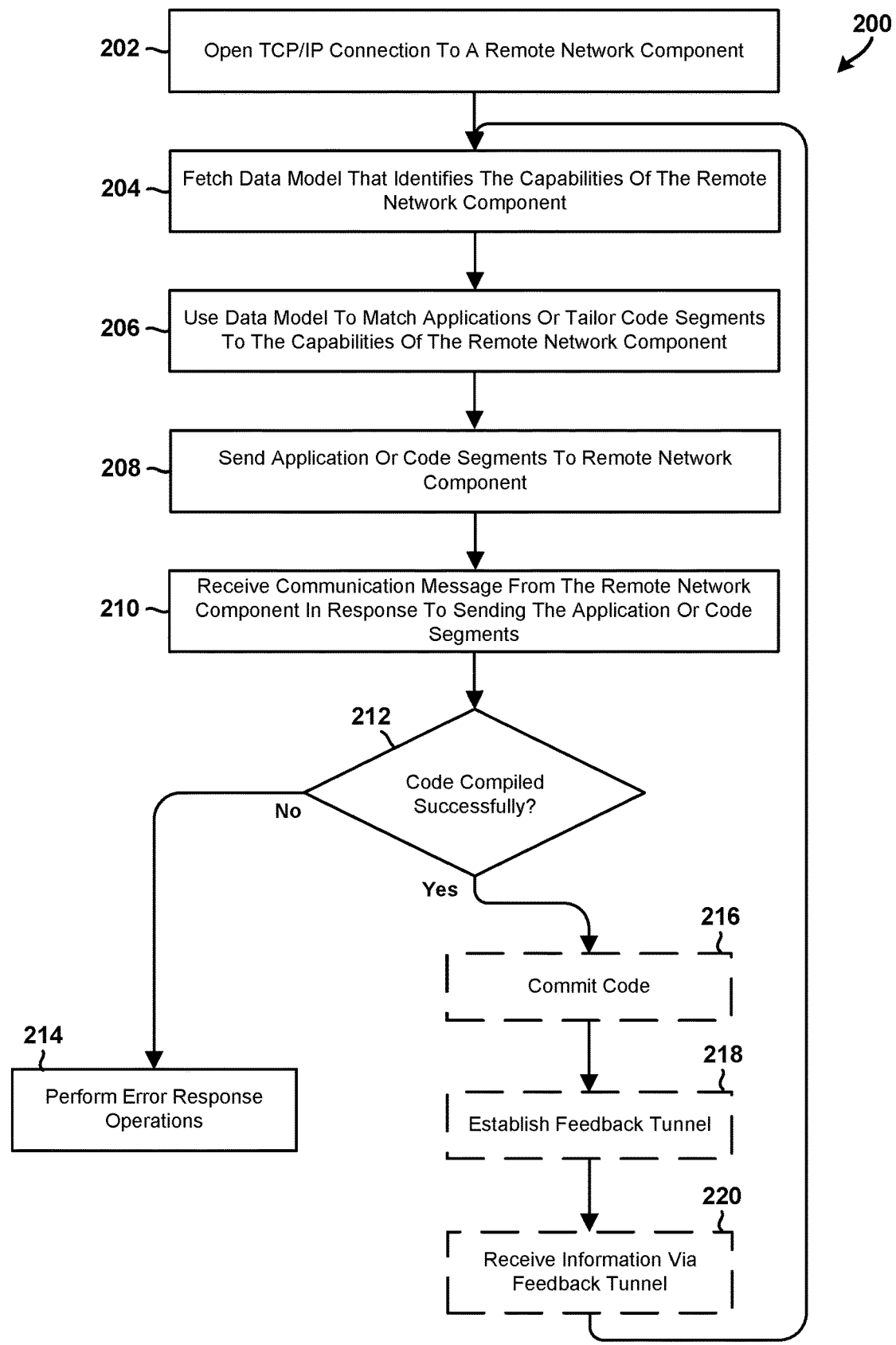
FIGS. 2 and 3 are process flow diagrams that illustrate embodiment methods for remotely and dynamically augmenting or altering the functionalities of forwarding plane components that are deployed in the communication network.

FIG. 2 illustrates a method 200 for using a domain-specific programming language (e.g., the P4 programming language, etc.) to remotely and dynamically program, re-program, or otherwise alter the functionality of a packet processor included in a network component (e.g., access router, access switch, etc.) deployed in a communication network. Method 200 may be performed via one or more processors in a controlling server component or computing device, which may be deployed within the cloud.

In block 202, the controlling server may activate communication circuitry and open a TCP/IP connection in order to communicate with one or more remote network components. In block 204, the controlling server may fetch a data model that identifies the capabilities of at least one of the remote network components. For example, the data model may identify how much memory remains available in the remote network component, how may cycles the remote network component may allocate for augmented functionalities, how many processing blocks are available, how many tables are available, the software or operating system versions, hardware configuration information, etc.

In block 206, the controlling server may use the data model to match an application or tailor a code segment to the capabilities of the remote network component. In block 208, the controlling server may send a matched application and/or a tailored code segment to the remote network component. The network component may receive the application or code segment, and begin compiling it into a domain-specific binary code that is suitable for execution on a packet processor. If the compile is not successful, the network component may send an error message to the controlling server. If the compile is successful, the network component may send a "compile success" message to the controlling server, and install the domain-specific binary code for execution via the packet processor (e.g., to quickly and efficiently augment or alter its functionality).

In block 210, the controlling server may receive a communication message from the remote network component (e.g., in response to sending the application or code segments to the remote network component). In determination block 212, the controlling server may use the information included in the received communication message to determine whether the remote network component compiled the application or code segments successfully. In response to determining that the remote network component did not compile the application or code segments successfully (i.e., determination block 212="No"), the controlling server may perform various error response operations in block 214.

In response to determining that the remote network component was able to successfully compile the application or code segments (i.e., determination block 212="Yes"), the controlling server may perform various optional operations in blocks 216-220. For example, the controlling server may commit the code and/or request that the remote network component commit the code in optional block 216. In optional block 218, the controlling server may establish a feedback tunnel with the remote network component. In optional block 220, the controlling server may receive runtime, execution or error information via the feedback tunnel. For example, the controlling server may receive data models, telemetry data, channel or tunnel to report compile time errors, device capability mis-matches, resource exhaustion and/or other similar information via the feedback tunnel. In various embodiments, the controlling server may be configured to perform any or all of the operations in blocks 204-220 based on the information it receives via the feedback tunnel.

Figure 3:
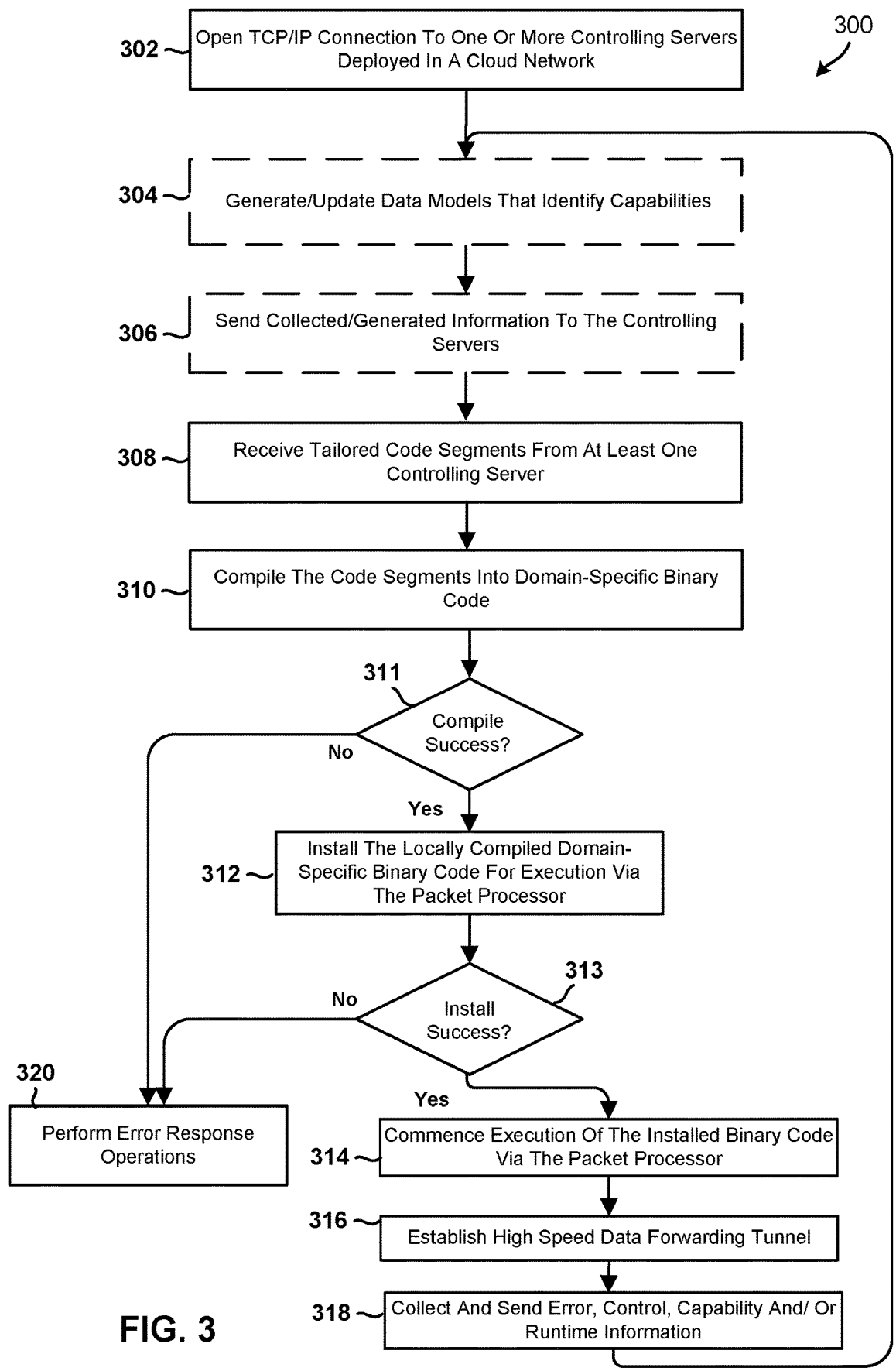

FIG. 3 illustrates a method 300 for using a domain-specific programming language dynamically program, re-program, or otherwise alter the functionality of a packet processor included in a network component. Method 300 may be performed via one or more processors (e.g., control processor, packet processor, etc.) in a network component (e.g., access router, access switch, etc.). In block 302, the network component may open a TCP/IP connection to communicate with a controlling server that is deployed in a cloud network. In block 304, the network component may use domain-specific modeling language to generate a data model that identifies various device capabilities (e.g., processing capabilities, available memory, available bandwidth, operating system version, hardware configurations, supported protocols, etc.).

In block 306, the network component may send generated data model to the controlling server. In block 308, the network component may receive tailored code segments (e.g., domain-specific programming language code segments, P4 programming primitives, etc.) from controlling server. In block 310, the network component may begin compiling the code segments into domain-specific binary code.

In determination block 311, the network component may determine whether there are important compilation errors or whether the compile operations were successful. In response to determining that the compile operations were not successful (i.e., determination block 311="No"), the network component may perform various error response operations in block 320. In response to determining that the compile operations were successful (i.e., determination block 311="Yes"), the network component may install the locally compiled domain-specific binary code for execution (e.g., via its associated packet processor, etc.) in block 312.

In determination block 313, the network component may determine whether the installation of the locally compiled domain-specific binary code was successful and/or whether the code segments successfully fit. For example, the network component may determine that the installation was not successful in response to determining that the system generated a "code does not fit" error. In response to determining that the installation was not successful (i.e., determination block 313="No"), the network component may perform various error response operations in block 320.

In response to determining that the code fits or the installation was successful (i.e., determination block 313="Yes"), in block 314, the network component may commence execution of the installed binary code via the packet processor to alter, update, or augment the functionality of the remote network component. For example, the execution of the domain-specific binary code in block 314 may cause the packet processor in the network component to can add an extra header to each packet (e.g., a timestamp after the IP address, etc.) prior to sending the packet to the next node in the network. Alternatively or in addition, the execution of the domain-specific binary code in block 314 may cause the packet processor in the network component to inspect packets for extra headers, extract and analyze the information included in the extra headers (e.g., it took 221 milliseconds for packet to travel from an entry point to an exit point, etc.), and remove the extra headers from the identified packets prior to sending them to the next node in the network. As a further example, the execution of the domain-specific binary code in block 314 may cause the packet processor in the network component to block certain packets based on dynamically determined characteristics (e.g., packet size, the amount of time it took the packet to traverse the network, the packet's source or destination component, etc.).

In optional block 316, the network component may establish a high speed data forwarding tunnel for further communications with the control server. In some embodiments, the network component may establish a high speed data forwarding tunnel by installing packet headers. In some embodiments, the network component may be configured to use the high speed data forwarding tunnel to forward copies of the "interesting" packets back to a server for further analysis. In some embodiments, the server may be configured to use the high speed data forwarding tunnel to inject special traffic in specific network locations.

In block 318, the network component may collect and send error, control, capability and/or runtime information to the controlling server. For example, in block 318, the network component may report that it took 221 milliseconds for particular packet to travel from an entry point to an exit point. The network component may also collect and send telemetry data, information about the performance of certain packets, channel or tunnel to report compile time errors, device capability mis-matches, resource exhaustion and/or other similar information via the high speed data forwarding tunnel in block 318. The controlling server may receive and use this information to generate or tailor additional code segments to dynamically alter the functionality of one or more of the remote network components deployed in the communication system. In some embodiments, the network component may repeat any or all of the operations in blocks 304 through 318 to repeatedly or continuously alter, update, or augment the functionality of the remote network component.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, and 550 may be substituted for or combined with one or more operations of the methods 400, 500, and 550, and vice versa.

Figure 4:
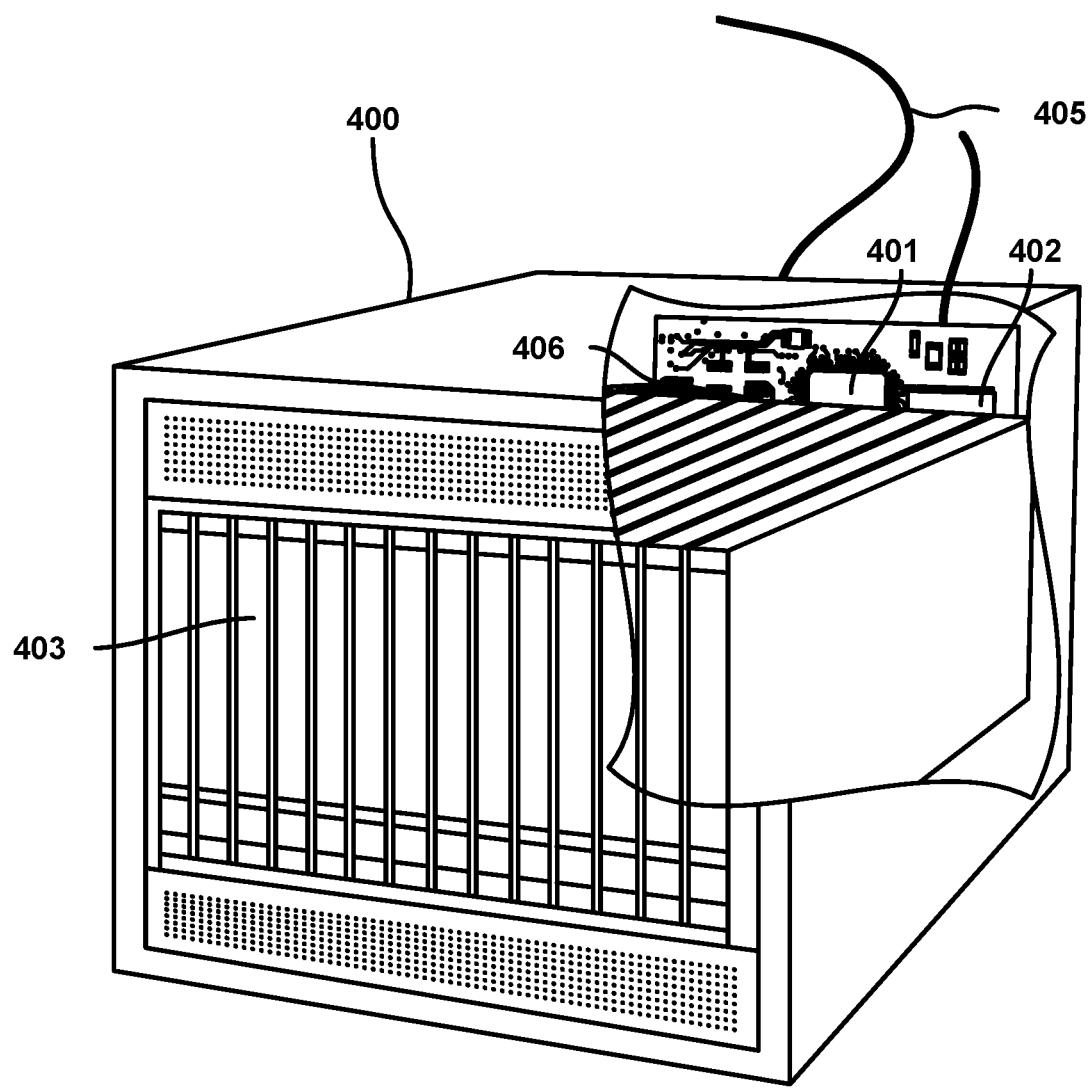
FIG. 4 is a component diagram of an example server suitable for implementing the various embodiments.

Various embodiments (including, but not limited to, embodiments discussed above with reference to FIGS. 1-3) may be implemented on any of a variety of commercially available computing devices, such as the server computing device 400 illustrated in FIG. 4. Such a server device 400 may include a processor 401 coupled to volatile memory 402 and a large capacity nonvolatile memory, such as a disk drive 403. The server device 400 may also include a floppy disc drive, USB, compact disc (CD) or DVD disc drive coupled to the processor 801. The server device 400 may also include network access ports 406 coupled to the processor 401 for establishing data connections with a network connection circuit 405 and a communication network (e.g., IP network) coupled to other communication system network elements.

Figure 5:
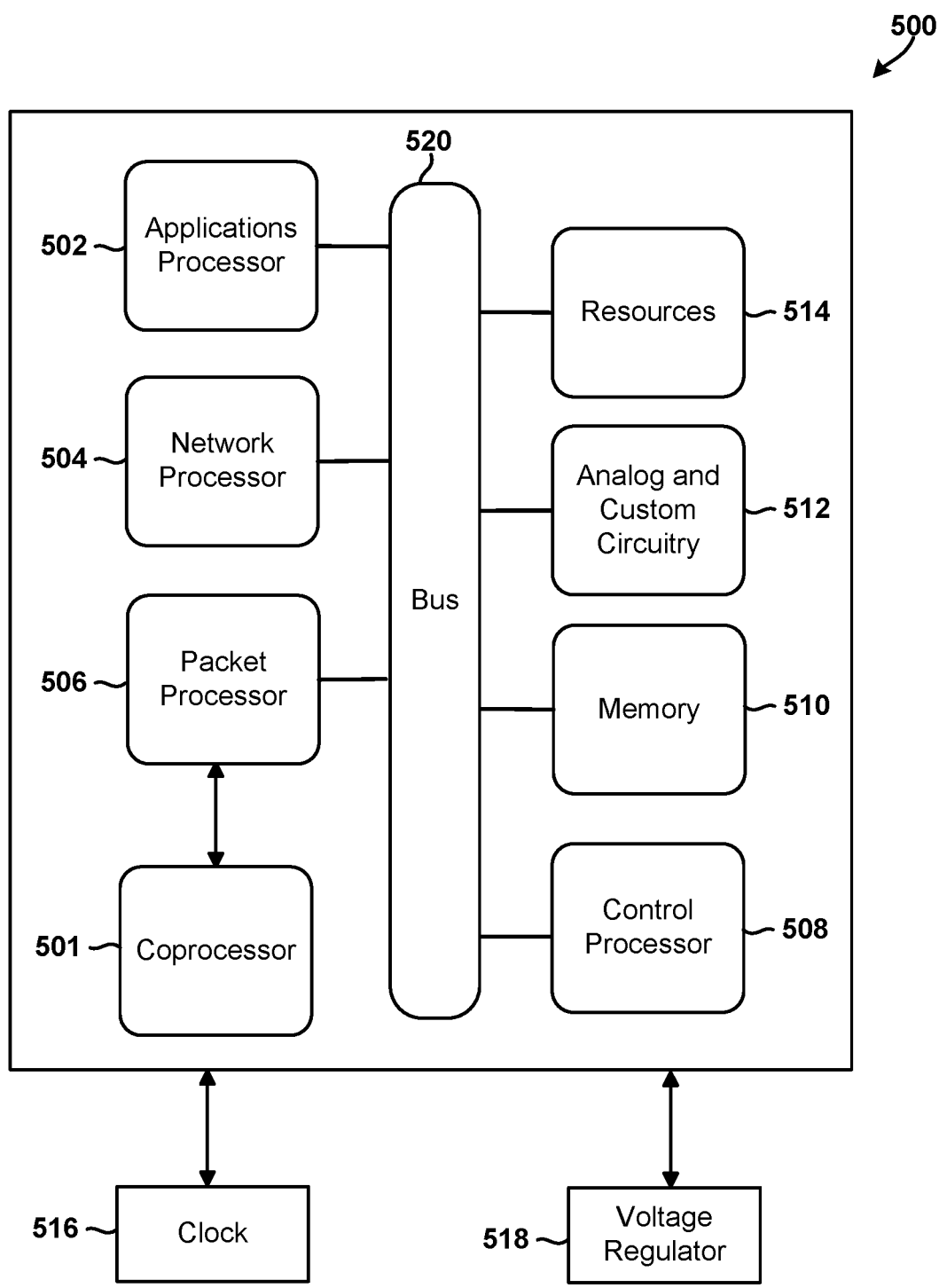
FIG. 5 is a component block diagram illustrating an example system-on-chip (SOC) architecture that may be used in computing devices implementing the various embodiments.

The various embodiments may be implemented on a number of single processor and multiprocessor computer systems, including a system-on-chip (SOC). FIG. 5 illustrates an example system-on-chip (SOC) 500 architecture that may be used in network component computing devices implementing the various embodiments. The SOC 500 may include a number of heterogeneous processors, such as an application processor 102, a network processor 504, a packet processor 506, and a control processor 508. The SOC 500 may also include one or more coprocessors 501 (e.g., vector co-processor) connected to one or more of the heterogeneous processors 502-508. Each processor 501-508 may include one or more cores, and each processor/core may perform operations independent of the other processors/cores. For example, the SOC 500 may include a processor that executes a first type of operating system (e.g., FreeBSD, etc.) and a processor that executes a second type of operating system (e.g., LINUX, etc.).

The packet processor 506 may be a P4 programmable packet processor. The packet processor 506 may implemented via an application specific integrated circuits (ASIC) or an integrated circuit (IC) that is customized for a particular routing use. In some embodiments, the packet processor 506 may include multiple sub-processing blocks that are each configured to perform a specific function.

The SOC 500 may also include analog circuitry and custom circuitry 512 for managing sensor data, wireless data transmissions, and for performing other specialized operations, such as processing IP data packets. The SOC 500 may further include system components and resources 514, such as voltage regulators, oscillators, phase-locked loops, peripheral bridges, data controllers, memory controllers, system controllers, access ports, timers, and other similar components used to support the processors and software clients (e.g., a web browser) running on a computing device.

The system components and resources 514 and/or custom circuitry 512 may include circuitry to interface with peripheral devices, such as electronic displays, wireless communication devices, external memory chips, etc. The processors 501-508 may be interconnected to one or more memory elements 510, system components and resources 514, and custom circuitry 514 via an interconnection/bus component 520 which may include an array of reconfigurable logic gates and/or implement a bus architecture (e.g., CoreConnect, AMBA, etc.). Communications may be provided by advanced interconnects, such as high performance networks-on chip (NoCs).

The SOC 500 may further include an input/output module (not illustrated) for communicating with resources external to the SOC, such as a clock 516 and a voltage regulator 518. Resources external to the SOC (e.g., clock 516, voltage regulator 518) may be shared by two or more of the internal SOC processors/cores.

In addition to the SOC 500 discussed above, the various embodiments may be implemented in a wide variety of computing systems, which may include a single processor, multiple processors, multicore processors, or any combination thereof.

Figure 6:
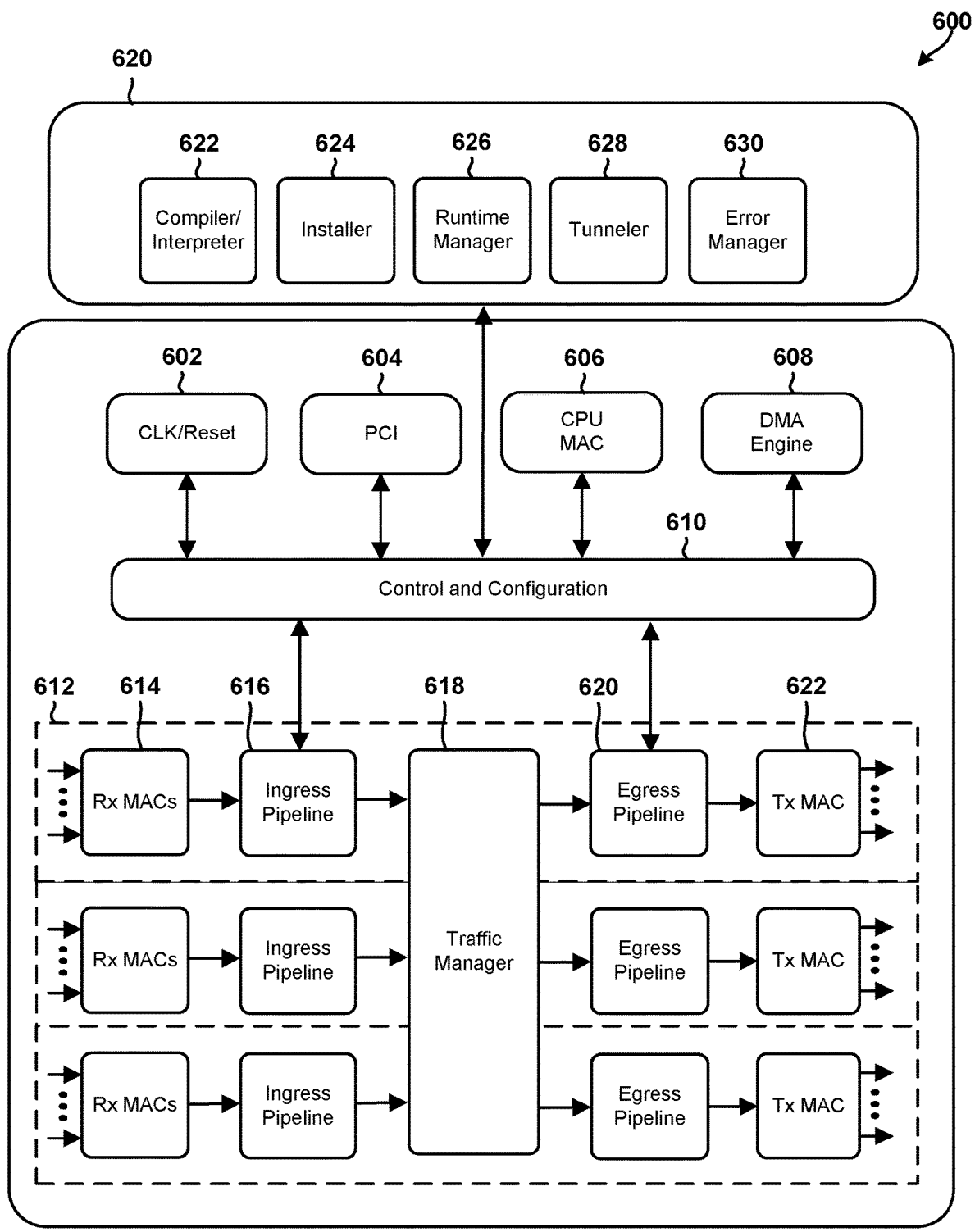
FIG. 6 is a component block diagram illustrating an integrated switch, forwarder and management plane component architecture that may be used to implement various embodiments.

FIG. 6 illustrates an example system 600 architecture that may be used in network component computing devices in accordance with various embodiments. In the example illustrated in FIG. 6, the system 600 includes a clock/reset component 602, a peripheral component interconnect (PCI) component 604, a central processing unit (CPU) media access control (MAC) component 606, a direct memory access (DMA) engine component 608, and a control and configuration component 610. The system 600 includes a plurality of processing blocks 612 that implement a switch architecture that could be partitioned and/or controlled by the various embodiments. In the illustrated example, the processing blocks 612 each include or utilize a receiver MACs component 614, an ingress pipeline component 616, a traffic manager component 618, an egress pipeline component 620, and a transmission MAC component 622.

The system 600 illustrated in FIG. 6 further includes an integrated switch management plane 620 that includes a compiler or interpreter component 622, an installer component 624, a runtime manager component 626, a tunneler component 628, and an error manager component 630. The compiler or interpreter component 622 may be configured to receive and compile the code segments into domain-specific binary code that is suitable for execution on a packet processor, or via the runtime manager 626 and/or CPU MAC component 606. The installer component 624 may be configured to install the domain-specific binary code for execution via the packet processor, or via the runtime manager 626 and/or CPU MAC component 606. As mentioned above, the efficient installation of locally compiled domain-specific binary code enables the system to quickly and efficiently augment or alter the functionality of a deployed network component in real time, while in service. The runtime manager component 626 may be configured to manage the runtime system or execution environment. The tunneler component 628 may be configured to establish a high speed data forwarding tunnel for communicating with a control server. The error manager component 630 may be configured to perform various error response operations.

Some embodiments may include systems that include a controlling server computing device and a network device/component (e.g., network component 104b illustrated in FIG. 1). The controlling server computing device may include a server processor that may be configured with processor-executable instructions to perform operations that include establishing a communication link to the network device, receiving a capabilities data model from the network device via the communication link, generating a tailored code segment based on information included in the received capabilities data model, and sending the tailored code segment to the network device via the communication link to modify the functionality of the network device. The network device/component may include a device processor, a compiler, a forwarding plane component, and/or an integrated switch management plane. The device processor may be configured with processor-executable instructions to perform operations that include receiving the tailored code segment, compiling the tailored code segment to generate domain-specific binary code, installing the domain-specific binary code to be executed by the packet processor, and executing the installed the domain-specific binary code via the packet processor to modify the functionality of the network device.

Some embodiments may include methods of dynamically programming a remote network component that is deployed in a communication network. These methods may include establishing (e.g., via a processor and communication circuitry in a controlling server computing device, etc.) a communication link to the remote network component, receiving in the controlling server computing device a capabilities data model from the remote network component via the communication link, generating via the processor in the controlling server computing device a tailored code segment based on information included in the received capabilities data model, and sending the tailored code segment to the remote network component via the communication link to dynamically modify the functionality of the remote network component.

In some embodiments, the method may further include receiving the tailored code segment in the remote network component, compiling the tailored code segment in the remote network component to generate domain-specific binary code, installing the domain-specific binary code to be executed by a forwarding plane component or packet processor of the remote network component, and executing the installed domain-specific binary code via the forwarding plane component or packet processor to dynamically modify the functionality of the remote network component. In a further embodiment, compiling the tailored code segment in the remote network component to generate the domain-specific binary code may include compiling a tailored P4 computer language code segment in the remote network component to generate the domain-specific binary code. In a further embodiment, the method may include using a domain-specific modeling language to generate the capabilities data model in the remote network component.

In some embodiments, the method may include establishing a high speed data forwarding tunnel between the controlling server computing device and the remote network component. In a further embodiment, the method may include receiving (e.g., via the processor polling a data port, activating communication circuitry, etc.) a communication message from the remote network component in response to sending the generated code segment to the remote network component, in which the received communication message includes information indicating whether the generated code segment successfully complied in the remote network component.

In some embodiments, generating the tailored code segment based on information included in the received capabilities data model may include generating a tailored domain-specific programming language code segment. In a further embodiment, the method may include determining whether to send the tailored code segment to the remote network component based on the information included in the received capabilities data model. In a further embodiment, generating the tailored code segment based on information included in the received capabilities data model may include tailoring the code segment to ensure that it matches the capabilities of the remote network component. In a further embodiment, the method may include sending data to populate a lookup table that was created based on the tailored code segment.

In some embodiments, the method may include receiving in the controlling server computing device a communication message from the remote network component, in which the received communication message may include information generated based on a tailored code segment. In a further embodiment, generating the tailored code segment based on information included in the received capabilities data model may include generating a plurality of different tailored code segments via a plurality of different cloud applications. In an embodiment sending the tailored code segment to the remote network component via the communication link to dynamically modify the functionality of the remote network component may include sending the plurality of different tailored code segments generated via the plurality of different cloud applications to the remote network component to dynamically modify the functionality of a forwarding plane component that is included in or otherwise associated with the remote network component.

In some embodiments, the methods of dynamically programming a remote network component deployed in a communication network may include receiving, via a processor (and communication circuitry, etc.) in a remote network component a tailored code segment from a controlling server computing device, compiling the tailored code segment via the device processor to locally generate domain-specific binary code in the remote network component, and executing the domain-specific binary code via a forwarding plane component that is included in or associated with the remote network component in order to dynamically modify the functionality of the network device.

In a further embodiment, compiling the tailored code segment to generate the domain-specific binary code may include compiling a tailored P4 computer language code segment to generate the domain-specific binary code. In a further embodiment, the method may include using a domain-specific modeling language to generate the capabilities data model in the network device. In a further embodiment, the method may include establishing a high speed data forwarding tunnel between the controlling server computing device and the network device. In a further embodiment, the method may include determining whether the generated code segment successfully complied in the network device, generating a communication message that includes information indicating whether the generated code segment successfully complied in the network device, and sending the generated communication message to the controlling server computing device. In a further embodiment, receiving the tailored code segment from the controlling server computing device includes receiving a tailored domain-specific programming language code segment.

In a further embodiment, receiving the tailored code segment from the controlling server computing device may include receiving a code segment tailored to match the capabilities of the network device. In a further embodiment, the method may include creating a lookup table based on the tailored code segment received from the controlling server computing device, receiving additional data from the controlling server computing device in response to creating the lookup table, and populating the lookup table based on the additional data received from the controlling server computing device. In a further embodiment, receiving the tailored code segment from the controlling server computing device may include receiving a plurality of different tailored code segments generated via a plurality of different cloud applications. In a further embodiment, compiling the tailored code segment via the compiler to generate the domain-specific binary code may include compiling the plurality of different tailored code segments generated via the plurality of different cloud applications to generate the domain-specific binary code. In a further embodiment, executing the domain-specific binary code via a forwarding plane component to dynamically modify the functionality of the network device may include executing the domain-specific binary code via a packet processor to dynamically modify the functionality of the network device.

Further embodiments may include a controlling server computing device that includes a processor configured with processor-executable instructions to perform operations including establishing a communication link to the remote network component, receiving a capabilities data model from the remote network component via the communication link, generating a tailored code segment based on information included in the received capabilities data model, and sending the tailored code segment to the remote network component via the communication link to dynamically modify the functionality of the remote network component.

In an embodiment, the processor may be configured with processor-executable instructions to perform operations that further include establishing a high speed data forwarding tunnel between the controlling server computing device and the remote network component. In a further embodiment, the processor may be configured with processor-executable instructions to perform operations that further include receiving a communication message from the remote network component in response to sending the generated code segment to the remote network component, in which the received communication message includes information indicating whether the generated code segment successfully complied in the remote network component.

In a further embodiment, the processor may be configured with processor-executable instructions to perform operations such that generating the tailored code segment based on information included in the received capabilities data model includes generating a tailored domain-specific programming language code segment. In a further embodiment, the processor may be configured with processor-executable instructions to perform operations that further include determining whether to send the tailored code segment to the remote network component based on the information included in the received capabilities data model. In a further embodiment, the processor may be configured with processor-executable instructions to perform operations such that generating the tailored code segment based on information included in the received capabilities data model including tailoring the code segment to ensure that it matches the capabilities of the remote network component.

In a further embodiment, the processor may be configured with processor-executable instructions to perform operations that further include sending data to populate a lookup table created based on the tailored code segment. In a further embodiment, the processor may be configured with processor-executable instructions to perform operations that further include receiving from the remote network component a communication message that includes information that was generated based on a tailored code segment. In a further embodiment, the processor may be configured with processor-executable instructions to perform operations such that generating the tailored code segment based on information included in the received capabilities data model includes generating a plurality of different tailored code segments via a plurality of different cloud applications, and sending the tailored code segment to the remote network component via the communication link to dynamically modify the functionality of the remote network component includes sending the plurality of different tailored code segments generated via the plurality of different cloud applications to the remote network component to dynamically modify the functionality of a forwarding plane component that is associated with the remote network component.

Further embodiments may include a network device that includes a compiler, a forwarding plane component, and a processor coupled to the compiler and forwarding plane component. The processor may be configured with processor-executable instructions to perform operations including receiving a tailored code segment from a controlling server computing device, compiling the tailored code segment via the compiler to generate domain-specific binary code, and installing domain-specific binary code for execution via the forwarding plane component. The network device may execute the domain-specific binary code via the forwarding plane component to dynamically modify the functionality of the network device.

In an embodiment, the processor may be configured with processor-executable instructions to perform operations such that compiling the tailored code segment via the compiler to generate the domain-specific binary code includes compiling a tailored P4 computer language code segment via the compiler to generate the domain-specific binary code. In a further embodiment, the processor may be configured with processor-executable instructions to perform operations that further include using a domain-specific modeling language to generate the capabilities data model in the network device.

In a further embodiment, the processor may be configured with processor-executable instructions to perform operations that further include establishing a high speed data forwarding tunnel between the controlling server computing device and the network device. In a further embodiment, the processor may be configured with processor-executable instructions to perform operations that further include determining whether the generated code segment successfully complied in the network device, generating a communication message that includes information indicating whether the generated code segment successfully complied in the network device, and sending the generated communication message to the controlling server computing device.

In a further embodiment, the processor may be configured with processor-executable instructions to perform operations such that receiving the tailored code segment from the controlling server computing device includes receiving a tailored domain-specific programming language code segment. In a further embodiment, the processor may be configured with processor-executable instructions to perform operations such that receiving the tailored code segment from the controlling server computing device includes receiving a code segment tailored to match the capabilities of the network device.

In a further embodiment, the processor may be configured with processor-executable instructions to perform operations that further include creating a lookup table based on the tailored code segment received from the controlling server computing device, receiving additional data from the controlling server computing device in response to creating the lookup table, and populating the lookup table based on the additional data received from the controlling server computing device.

In a further embodiment, the processor may be configured with processor-executable instructions to perform operations such that receiving the tailored code segment from the controlling server computing device includes receiving a plurality of different tailored code segments generated via a plurality of different cloud applications. In a further embodiment, the processor may be configured with processor-executable instructions to perform operations such that compiling the tailored code segment via the compiler to generate the domain-specific binary code includes compiling the plurality of different tailored code segments generated via the plurality of different cloud applications to generate the domain-specific binary code. In a further embodiment, the processor may be configured with processor-executable instructions to perform operations such that installing and executing the domain-specific binary code via the forwarding plane component to dynamically modify the functionality of the network device includes installing and executing the domain-specific binary code via a packet processor to dynamically modify the functionality of the network device.

Further embodiments may include a non-transitory computer readable storage medium having stored thereon processor-executable software instructions configured to cause a processor in a controlling server computing device to perform operations that include establishing a communication link to the remote network component, receiving a capabilities data model from the remote network component via the communication link, generating a tailored code segment based on information included in the received capabilities data model, and sending the tailored code segment to the remote network component via the communication link to dynamically modify the functionality of the remote network component.

In an embodiment, the stored processor-executable instructions may be configured to cause the processor in the controlling server computing device to perform operations that further include establishing a high speed data forwarding tunnel between the controlling server computing device and the remote network component. In a further embodiment, the stored processor-executable instructions may be configured to cause the processor in the controlling server computing device to perform operations that further include receiving a communication message from the remote network component in response to sending the generated code segment to the remote network component, in which the received communication message includes information indicating whether the generated code segment successfully complied in the remote network component. In a further embodiment, the stored processor-executable instructions may be configured to cause the processor in the controlling server computing device to perform operations such that generating the tailored code segment based on information included in the received capabilities data model includes generating a tailored domain-specific programming language code segment.

In a further embodiment, the stored processor-executable instructions may be configured to cause the processor in the controlling server computing device to perform operations that further include determining whether to send the tailored code segment to the remote network component based on the information included in the received capabilities data model. In a further embodiment, the stored processor-executable instructions may be configured to cause the processor in the controlling server computing device to perform operations such that generating the tailored code segment based on information included in the received capabilities data model including tailoring the code segment to ensure that it matches the capabilities of the remote network component.

In a further embodiment, the stored processor-executable instructions may be configured to cause the processor in the controlling server computing device to perform operations that further include sending data to populate a lookup table created based on the tailored code segment. In a further embodiment, the stored processor-executable instructions may be configured to cause the processor in the controlling server computing device to perform operations that further include receiving a communication message from the remote network component, in which the received communication message includes information generated based on a tailored code segment.

In a further embodiment, the stored processor-executable instructions may be configured to cause the processor in the controlling server computing device to perform operations such that generating the tailored code segment based on information included in the received capabilities data model includes generating a plurality of different tailored code segments via a plurality of different cloud applications, and sending the tailored code segment to the remote network component via the communication link to dynamically modify the functionality of the remote network component includes sending the plurality of different tailored code segments generated via the plurality of different cloud applications to the remote network component to dynamically modify the functionality of a forwarding plane component that is associated with the remote network component.

Further embodiments may include a non-transitory computer readable storage medium having stored thereon processor-executable software instructions configured to cause a processor in a network device to perform operations including receiving a tailored code segment from a controlling server computing device, compiling the tailored code segment via a compiler to generate domain-specific binary code, installing and executing the domain-specific binary code via a forwarding plane component to dynamically modify the functionality of the network device.

In a further embodiment, the stored processor-executable instructions may be configured to cause the processor in the network device to perform operations such that compiling the tailored code segment via the compiler to generate the domain-specific binary code includes compiling a tailored P4 computer language code segment via the compiler to generate the domain-specific binary code. In a further embodiment, the stored processor-executable instructions may be configured to cause the processor in the network device to perform operations that further include using a domain-specific modeling language to generate the capabilities data model in the network device.

In a further embodiment, the stored processor-executable instructions may be configured to cause the processor in the network device to perform operations that further include establishing a high speed data forwarding tunnel between the controlling server computing device and the network device. In a further embodiment, the stored processor-executable instructions may be configured to cause the processor in the network device to perform operations that further include determining whether the generated code segment successfully complied in the network device, generating a communication message that includes information indicating whether the generated code segment successfully complied in the network device, and sending the generated communication message to the controlling server computing device.

In a further embodiment, the stored processor-executable instructions may be configured to cause the processor in the network device to perform operations such that receiving the tailored code segment from the controlling server computing device includes receiving a tailored domain-specific programming language code segment. In a further embodiment, the stored processor-executable instructions may be configured to cause the processor in the network device to perform operations such that receiving the tailored code segment from the controlling server computing device includes receiving a code segment tailored to match the capabilities of the network device.

In a further embodiment, the stored processor-executable instructions may be configured to cause the processor in the network device to perform operations that further include creating a lookup table based on the tailored code segment received from the controlling server computing device, receiving additional data from the controlling server computing device in response to creating the lookup table, and populating the lookup table based on the additional data received from the controlling server computing device.

In a further embodiment, the stored processor-executable instructions may be configured to cause the processor in the network device to perform operations such that receiving the tailored code segment from the controlling server computing device includes receiving a plurality of different tailored code segments generated via a plurality of different cloud applications. In a further embodiment, the stored processor-executable instructions may be configured to cause the processor in the network device to perform operations such that compiling the tailored code segment via the compiler to generate the domain-specific binary code includes compiling the plurality of different tailored code segments generated via the plurality of different cloud applications to generate the domain-specific binary code. In a further embodiment, the stored processor-executable instructions may be configured to cause the processor in the network device to perform operations such that installing and executing the domain-specific binary code via the forwarding plane component to dynamically modify the functionality of the network device includes installing the domain-specific binary code via the processor and executing the domain-specific binary code via a packet processor to dynamically modify the functionality of the network device.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of dynamically programming a remote network component deployed in a communication network, the method comprising:
    establishing, via a processor in a controlling server computing device, a communication link to the remote network component;
    receiving, via the processor in the controlling server computing device, a capabilities data model generated using a domain-specific modeling language from the remote network component via the communication link, wherein the received capabilities data model identifies one or more functional capabilities of the remote network component;
    generating, via the processor in the controlling server computing device, a tailored domain-specific programming language code segment based on information included in the received capabilities data model generated using the domain-specific modeling language; and
    sending, via the processor in the controlling server computing device, the tailored domain-specific programming language code segment to the remote network component via the communication link to dynamically modify a functionality of a packet processor associated with the remote network component.

2. The method of claim 1, further comprising:
    receiving the tailored domain-specific programming language code segment in the remote network component;
    compiling the tailored domain-specific programming language code segment in the remote network component to generate domain-specific binary code;
    installing the domain-specific binary code to be executed by the packet processor; and
    executing the installed the domain-specific binary code via the packet processor to dynamically modify the functionality of the packet processor associated with the remote network component.

3. The method of claim 2, wherein compiling the tailored domain-specific programming language code segment in the remote network component to generate the domain-specific binary code comprises compiling a tailored P4 computer language code segment in the remote network component to generate the domain-specific binary code.

4. The method of claim 2, further comprising:
    using the domain-specific modeling language to generate the capabilities data model in the remote network component.

5. The method of claim 2, further comprising sending data to populate a lookup table created based on the tailored domain-specific programming language code segment.

6. The method of claim 1, further comprising:
    establishing a data forwarding tunnel between the controlling server computing device and the remote network component.

7. The method of claim 1, further comprising:
    receiving, via the processor in the controlling server computing device, a communication message from the remote network component in response to sending the generated code segment to the remote network component,
    wherein the received communication message includes information indicating whether the generated code segment successfully complied in the remote network component.

8. The method of claim 1, further comprising:
    determining whether to send the tailored domain-specific programming language code segment to the remote network component based on the information included in the received capabilities data model generated using the domain-specific modeling language.

9. The method of claim 1, wherein generating the tailored domain-specific programming language code segment based on information included in the received capabilities data model generated using the domain-specific modeling language comprising tailoring a code segment to ensure that it matches the capabilities of the remote network component.

10. The method of claim 1, further comprising:
    receiving, via the processor in the controlling server computing device, a communication message from the remote network component,
    wherein the received communication message includes information generated based on the tailored domain-specific programming language code segment.

11. The method of claim 1, wherein:
    generating, via the processor in the controlling server computing device, the tailored domain-specific programming language code segment based on information included in the received capabilities data model generated using the domain-specific modeling language comprises generating a plurality of different tailored domain-specific programming language code segments via a plurality of different cloud applications; and
    sending, via the processor in the controlling server computing device, the tailored domain-specific programming language code segment to the remote network component via the communication link to dynamically modify the functionality of the packet processor associated with the remote network component comprises sending the plurality of different tailored domain-specific programming language code segments generated via the plurality of different cloud applications to the remote network component to dynamically modify the functionality of the packet processor that is associated with the remote network component.

12. A controlling server computing device, comprising:
    a processor configured with processor-executable instructions to perform operations comprising:

establishing a communication link to a remote network component;

receiving a capabilities data model generated using a domain-specific modeling language from the remote network component via the communication link, wherein the received capabilities data model identifies one or more functional capabilities of the remote network component;

generating a tailored domain-specific programming language code segment based on information included in the received capabilities data model generated using the domain-specific modeling language; and sending the tailored domain-specific programming language code segment to the remote network component via the communication link to dynamically modify a functionality of a packet processor associated with the remote network component.

13. The controlling server computing device of claim 12, wherein the processor is configured with processor-executable instructions to perform operations further comprising establishing a data forwarding tunnel between the controlling server computing device and the remote network component.

14. The controlling server computing device of claim 12, wherein the processor is configured with processor-executable instructions to perform operations further comprising receiving a communication message from the remote network component in response to sending the generated code segment to the remote network component, wherein the received communication message includes information indicating whether the generated code segment successfully complied in the remote network component.

15. The controlling server computing device of claim 12, wherein the processor is configured with processor-executable instructions to perform operations further comprising determining whether to send the tailored domain-specific programming language code segment to the remote network component based on the information included in the received capabilities data model generated using the domain-specific modeling language.

16. The controlling server computing device of claim 12, wherein the processor is configured with processor-executable instructions to perform operations such that generating the tailored domain-specific programming language code segment based on information included in the received capabilities data model generated using the domain-specific modeling language comprising tailoring a code segment to ensure that it matches the capabilities of the remote network component.

17. The controlling server computing device of claim 12, wherein the processor is configured with processor-executable instructions to perform operations further comprising sending data to populate a lookup table created based on the tailored domain-specific programming language code segment.

18. The controlling server computing device of claim 12, wherein the processor is configured with processor-executable instructions to perform operations further comprising receiving a communication message from the remote network component, wherein the received communication message includes information generated based on the tailored domain-specific programming language code segment.

19. The controlling server computing device of claim 12, wherein the processor is configured with processor-executable instructions to perform operations such that:

generating the tailored domain-specific programming language code segment based on information included in the received capabilities data model generated using the domain-specific modeling language comprises generating a plurality of different tailored domain-specific programming language code segments via a plurality of different cloud applications; and sending the tailored domain-specific programming language code segment to the remote network component via the communication link to dynamically modify the functionality of the packet processor associated with the remote network component comprises sending the plurality of different tailored domain-specific programming language code segments generated via the plurality of different cloud applications to the remote network component to dynamically modify the functionality of the packet processor that is associated with the remote network component.

20. A network device, comprising:
a compiler;
a packet processor; and
a processor coupled to the compiler and the packet processor, wherein the processor is configured with processor-executable instructions to perform operations comprising:
using a domain-specific modeling language to generate a capabilities data model that identifies one or more functional capabilities of the network device;
sending the generated capabilities data model to a controlling server computing device;
receiving a tailored domain-specific programming language code segment generated based on the capabilities data model from the controlling server computing device;
compiling the tailored domain-specific programming language code segment via the compiler to generate domain-specific binary code; and
executing the domain-specific binary code via the packet processor to dynamically modify a functionality of the packet processor.

21. The network device of claim 20, wherein the processor is configured with processor-executable instructions to perform operations such that compiling the tailored domain-specific programming language code segment via the compiler to generate the domain-specific binary code comprises compiling a tailored P4 computer language code segment via the compiler to generate the domain-specific binary code.

22. The network device of claim 20, wherein the processor is configured with processor-executable instructions to perform operations further comprising:
establishing a data forwarding tunnel between the controlling server computing device and the network device.

23. The network device of claim 20, wherein the processor is configured with processor-executable instructions to perform operations further comprising:
determining whether the generated code segment successfully complied in the network device;
generating a communication message that includes information indicating whether the generated code segment successfully complied in the network device; and
sending the generated communication message to the controlling server computing device.

24. The network device of claim 20, wherein the processor is configured with processor-executable instructions to perform operations such that receiving the tailored domain-specific programming language code segment generated based the capabilities data model from the controlling server computing device comprises receiving a code segment tailored to match the capabilities of the network device.

25. The network device of claim 20, wherein the processor is configured with processor-executable instructions to perform operations further comprising:
creating a lookup table based on the tailored domain-specific programming language code segment received from the controlling server computing device;
receiving additional data from the controlling server computing device in response to creating the lookup table; and
populating the lookup table based on the additional data received from the controlling server computing device.

26. The network device of claim 20, wherein the processor is configured with processor-executable instructions to perform operations such that:
receiving the tailored domain-specific programming language code segment generated based the capabilities data model from the controlling server computing device comprises receiving a plurality of different tailored domain-specific programming language code segments generated via a plurality of different cloud applications; and
compiling the tailored domain-specific programming language code segment via the compiler to generate the domain-specific binary code comprises compiling the plurality of different tailored domain-specific programming language code segments generated via the plurality of different cloud applications to generate the domain-specific binary code.

27. A non-transitory computer readable storage medium having stored thereon processor-executable software instructions configured to cause a processor in a controlling server computing device to perform operations comprising:
establishing a communication link to a remote network component;
receiving a capabilities data model generated using a domain-specific modeling language from the remote network component via the communication link;
generating a tailored domain-specific programming language code segment based on information included in the received capabilities data model generated using the domain-specific modeling language; and
sending the tailored domain-specific programming language code segment to the remote network component via the communication link to dynamically modify a functionality of a packet processor associated with the remote network component.

28. The non-transitory computer readable storage medium of claim 27, wherein the stored processor-executable instructions are configured to cause the processor in the controlling server computing device to perform operations further comprising:
establishing a data forwarding tunnel between the controlling server computing device and the remote network component.

29. The non-transitory computer readable storage medium of claim 27, wherein the stored processor-executable instructions are configured to cause the processor in the controlling server computing device to perform operations further comprising:
receiving a communication message from the remote network component in response to sending the generated code segment to the remote network component, wherein the received communication message includes information indicating whether the generated code segment successfully complied in the remote network component.

30. The non-transitory computer readable storage medium of claim 27, wherein the stored processor-executable instructions are configured to cause the processor in the controlling server computing device to perform operations further comprising determining whether to send the tailored domain-specific programming language code segment to the remote network component based on the information included in the received capabilities data model generated using the domain-specific modeling language.

31. The non-transitory computer readable storage medium of claim 27, wherein the stored processor-executable instructions are configured to cause the processor in the controlling server computing device to perform operations such that generating the tailored domain-specific programming language code segment based on information included in the received capabilities data model generated using the domain-specific modeling language comprising tailoring a code segment to ensure that it matches the capabilities of the remote network component.

32. The non-transitory computer readable storage medium of claim 27, wherein the stored processor-executable instructions are configured to cause the processor in the controlling server computing device to perform operations further comprising sending data to populate a lookup table created based on the tailored domain-specific programming language code segment.

33. The non-transitory computer readable storage medium of claim 27, wherein the stored processor-executable instructions are configured to cause the processor in the controlling server computing device to perform operations further comprising receiving a communication message from the remote network component, wherein the received communication message includes information generated based on the tailored domain-specific programming language code segment.

34. The non-transitory computer readable storage medium of claim 27, wherein the stored processor-executable instructions are configured to cause the processor in the controlling server computing device to perform operations such that:
generating the tailored domain-specific programming language code segment based on information included in the received capabilities data model generated using the domain-specific modeling language comprises generating a plurality of different tailored domain-specific programming language code segments via a plurality of different cloud applications; and
sending the tailored domain-specific programming language code segment to the remote network component via the communication link to dynamically modify the functionality of the packet processor associated with the remote network component comprises sending the plurality of different tailored domain-specific programming language code segments generated via the plurality of different cloud applications to the remote network component to dynamically modify the functionality of the packet processor that is associated with the remote network component.

35. A non-transitory computer readable storage medium having stored thereon processor-executable software instructions configured to cause a processor in a network device to perform operations comprising:

using a domain-specific modeling language to generate a capabilities data model that identifies one or more functional capabilities of the network device;
sending the generated capabilities data model to a controlling server computing device;
receiving a tailored domain-specific programming language code segment generated based on the capabilities data model from the controlling server computing device;
compiling the tailored domain-specific programming language code segment via a compiler to generate domain-specific binary code;
installing and executing the domain-specific binary code via a packet processor to dynamically modify a functionality of the packet processor.

36. The non-transitory computer readable storage medium of claim 35, wherein the stored processor-executable instructions are configured to cause the processor in the network device to perform operations such that compiling the tailored domain-specific programming language code segment via the compiler to generate the domain-specific binary code comprises compiling a tailored P4 computer language code segment via the compiler to generate the domain-specific binary code.

37. The non-transitory computer readable storage medium of claim 35, wherein the stored processor-executable instructions are configured to cause the processor in the network device to perform operations further comprising:
establishing a data forwarding tunnel between the controlling server computing device and the network device.

38. The non-transitory computer readable storage medium of claim 35, wherein the stored processor-executable instructions are configured to cause the processor in the network device to perform operations further comprising:
determining whether the generated code segment successfully complied in the network device;
generating a communication message that includes information indicating whether the generated code segment successfully complied in the network device; and
sending the generated communication message to the controlling server computing device.

39. The non-transitory computer readable storage medium of claim 35, wherein the stored processor-executable instructions are configured to cause the processor in the network device to perform operations such that receiving the tailored domain-specific programming language code segment generated based the capabilities data model from the controlling server computing device comprises receiving a code segment tailored to match the capabilities of the network device.

40. The non-transitory computer readable storage medium of claim 35, wherein the stored processor-executable instructions are configured to cause the processor in the network device to perform operations further comprising:
creating a lookup table based on the tailored domain-specific programming language code segment received from the controlling server computing device;
receiving additional data from the controlling server computing device in response to creating the lookup table; and
populating the lookup table based on the additional data received from the controlling server computing device.

41. The non-transitory computer readable storage medium of claim 35, wherein the stored processor-executable instructions are configured to cause the processor in the network device to perform operations such that:
receiving the tailored domain-specific programming language code segment generated based the capabilities data model from the controlling server computing device comprises receiving a plurality of different tailored domain-specific programming language code segments generated via a plurality of different cloud applications; and
compiling the tailored domain-specific programming language code segment via the compiler to generate the domain-specific binary code comprises compiling the plurality of different tailored domain-specific programming language code segments generated via the plurality of different cloud applications to generate the domain-specific binary code.

42. A system, comprising:
a controlling server computing device comprising a server processor; and
a network device comprising a device processor and a packet processor,
wherein:
the server processor is configured with processor-executable instructions to perform operations comprising:
establishing a communication link to the network device;
receiving a capabilities data model generated using a domain-specific modeling language from the network device via the communication link, wherein the received capabilities data model identifies one or more functional capabilities of the network device;
generating a tailored domain-specific programming language code segment based on information included in the received capabilities data model generated using the domain-specific modeling language; and
sending the tailored domain-specific programming language code segment to the network device via the communication link to modify a functionality of the packet processor; and
the device processor is configured with processor-executable instructions to perform operations comprising:
using the domain-specific modeling language to generate the capabilities data model that identifies the one or more functional capabilities of the network device;
sending the generated capabilities data model to the controlling server computing device;
receiving the tailored domain-specific programming language code segment generated based on the capabilities data model from the controlling server computing device;
compiling the tailored domain-specific programming language code segment to generate domain-specific binary code;
installing the domain-specific binary code to be executed by the packet processor; and
executing the installed the domain-specific binary code via the packet processor to modify the functionality of the packet processor.

43. A method of dynamically programming a network device deployed in a communication network, the method comprising:
using, by a processor in the network device, a domain-specific modeling language to generate a capabilities data model that identifies one or more functional capabilities of the network device;

sending, by the processor in the network device, the generated capabilities data model to a controlling server computing device;

receiving, via a processor in the network device, a tailored domain-specific programming language code segment generated based on the capabilities data model from the controlling server computing device;

compiling, via the processor, the tailored domain-specific programming language code segment to generate domain-specific binary code; and executing the domain-specific binary code via a packet processor to dynamically modify a functionality of the packet processor.

44. The method of claim 43, wherein compiling the tailored domain-specific programming language code segment to generate the domain-specific binary code comprises compiling a tailored P4 computer language code segment to generate the domain-specific binary code.

45. The method of claim 43, further comprising establishing a data forwarding tunnel between the controlling server computing device and the network device.

46. The method of claim 43, further comprising:
determining whether the generated code segment successfully complied in the network device;
generating a communication message that includes information indicating whether the generated code segment successfully complied in the network device; and
sending the generated communication message to the controlling server computing device.

47. The method of claim 43, wherein receiving the tailored domain-specific programming language code segment generated based the capabilities data model from the controlling server computing device comprises receiving a code segment tailored to match the capabilities of the network device.

48. The method of claim 43, further comprising:
creating a lookup table based on the tailored domain-specific programming language code segment received from the controlling server computing device;
receiving additional data from the controlling server computing device in response to creating the lookup table; and
populating the lookup table based on the additional data received from the controlling server computing device.

49. The method of claim 43, wherein:
receiving the tailored domain-specific programming language code segment generated based the capabilities data model from the controlling server computing device comprises receiving a plurality of different tailored domain-specific programming language code segments generated via a plurality of different cloud applications; and
compiling the tailored domain-specific programming language code segment to generate the domain-specific binary code comprises compiling the plurality of different tailored domain-specific programming language code segments generated via the plurality of different cloud applications to generate the domain-specific binary code.

* * * * *